Sept. 16, 1941.  F. L. PRESCOTT  2,255,809
PRESSURE INDICATOR
Original Filed Feb. 9, 1934    2 Sheets-Sheet 1
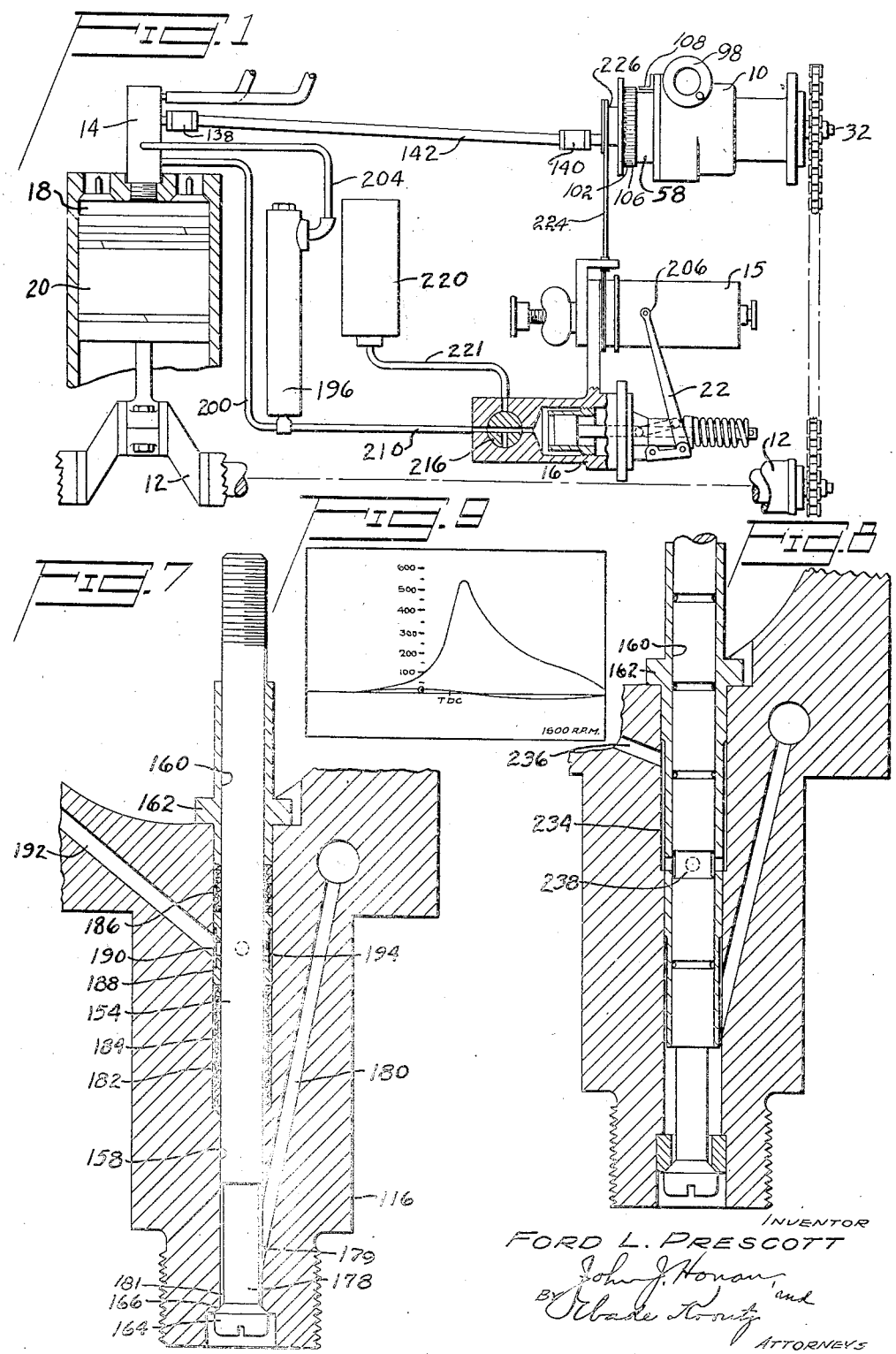
INVENTOR
FORD L. PRESCOTT
BY John J. Honan, and
Abbe Koenig
ATTORNEYS Sept. 16, 1941. F. L. PRESCOTT 2,255,809
PRESSURE INDICATOR
Original Filed Feb. 9, 1934 2 Sheets-Sheet 2
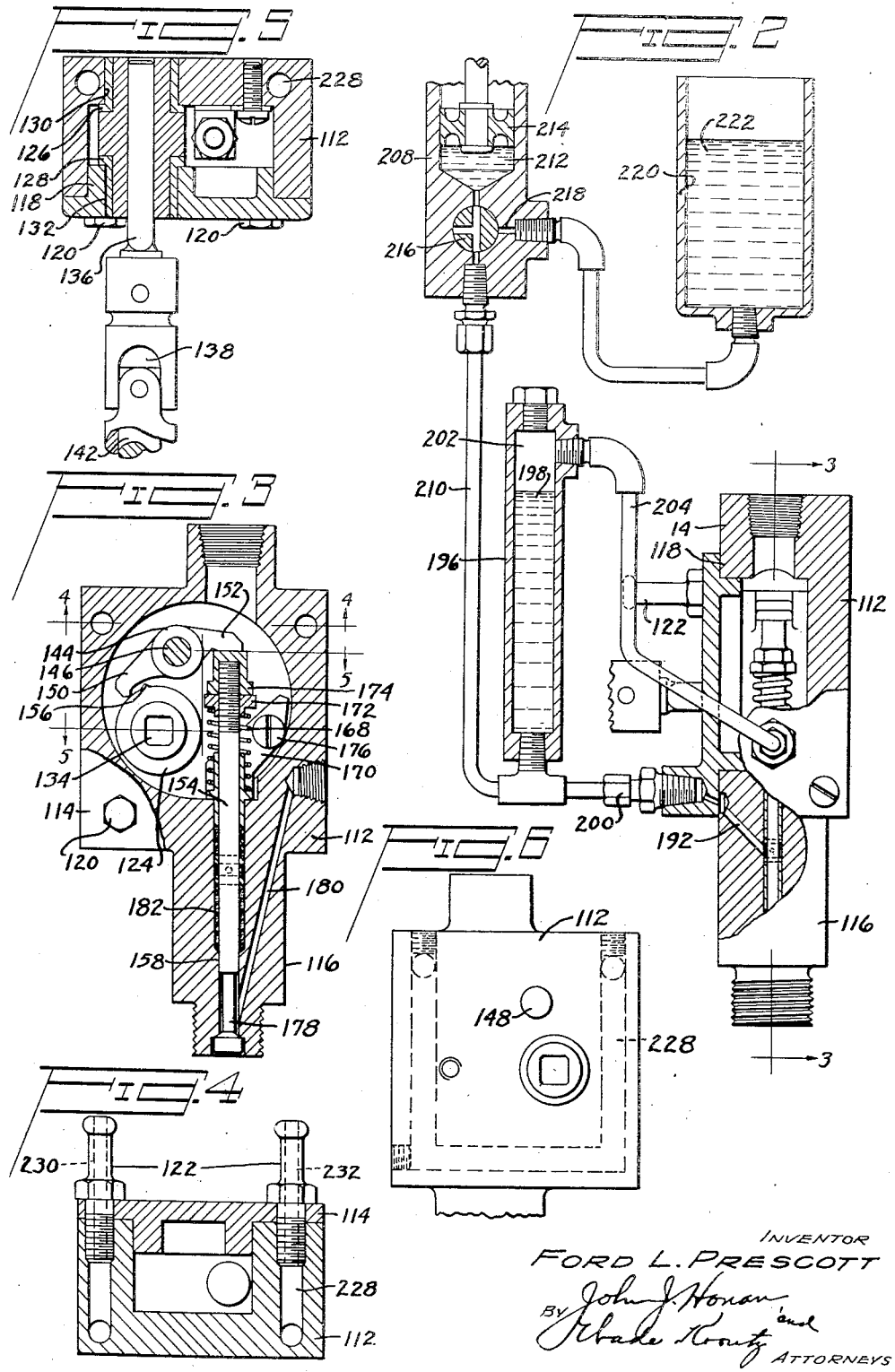
INVENTOR
FORD L. PRESCOTT
ATTORNEYS Patented Sept. 16, 1941

2,255,809

UNITED STATES PATENT OFFICE 2,255,809

PRESSURE INDICATOR

Ford L. Prescott, Dayton, Ohio

Original application February 9, 1934, Serial No. 710,500. Divided and this application February 2, 1937, Serial No. 123,633

6 Claims. (Cl. 73—30)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in pressure indicators and more particularly to indicators for recording the pressure diagrams of high speed engines, particularly of the internal combustion type, and is a division of my copending application Serial No. 710,500, filed February 9, 1934 which matured into Patent number 2,084,356, June 22, 1937.

The prior art teaches the use of indicating instrumentalities for testing and recording the pressure phenomena in high speed engines which embrace the sampling, or point by point method whereby the complete diagram of the average engine cycle is recorded.

In general, instruments of this character embody a sampler valve that is interposed between the combustion space and an ordinary low speed indicator and a phase gear that is employed to drive the sampler valve at engine cam shaft speed, the phase gear being so constructed that the phase or point in the cycle at which the valve opens for a brief instant is adjustable manually. The drum of the low speed indicator is also driven by the phase gear so that as the period of opening of the sampler valve is moved through the cycle, the drum will be simultaneously actuated in an amount proportionate to the corresponding crank angle or piston position. Continuous records are thus made of points taken from a large number of cycles of the engine. Suitable mechanism is provided between the phase gear and the recording drum so that the extent of displacement of the indicator drum will correspond either to the piston displacement or to the crank angle, as the function of either of which the pressure phenomena may be recorded.

The sampler valves that have heretofore been employed in devices of this character were remotely positioned from the point of combustion and they required a tube to connect the combustion space therewith; consequently introducing in the card record a time lag the extent of which depended upon the length of the tube connection and upon the rate at which the pressure is transmitted. Thus the entire card is caused to shift later by that time lag.

A further phase error was introduced in the card due to considerable back lash in the gear train of the phase changing mechanism heretofore employed.

The error introduced in the card by prior devices in which a valve was remotely positioned in the combustion chamber has been eliminated in accordance with my invention by positioning the sampler valve substantially at a wall of the combustion chamber.

The error that was introduced in the card by reason of the back lash present in the phase changing gear train of prior devices has been practically eliminated in accordance with my invention by reducing the number of gears to a minimum.

It has also been found by experiment that the sampler valves as well as the pressure recording element heretofore employed in devices of this character were not efficient at high pressures by reason of the fact that gases escaped between the working surfaces thereof with the result that the recorded pressures were found to be materially lower than the actual pressures within the combustion engine.

This invention therefore contemplates the provision of means for effectively sealing the working surfaces of the sampler valve to prevent the leakage of the gases through the clearances of the working surfaces under all operative conditions.

Certain other and further objects of my invention will appear from the following description of my invention taken in connection with the several view of the drawings.

Fig. 1 is a diagrammatic view of the system in which the several units are interconnected to produce a pressure time card and in which certain of the parts are shown in section.

Fig. 2 is a partial schematic view in side elevation and section showing the particular arrangement of the sampler valve and its inter-connections with the pressure recording element.

Fig. 3 is a transverse sectional view of the sampler valve taken on the line 3—3 of Fig. 2.

Fig. 4 is a transverse sectional view taken on the line 4—4 of Fig. 3.

Fig. 5 is a sectional view taken on the line 5—5 of Fig. 3 and showing also a fractional view of the driving connection.

Fig. 6 is a fractional side elevational view of the sampler unit.

Fig. 7 is an enlarged detail view of the poppet valve construction of the sampler valve shown in Fig. 3.

Fig. 8 is an enlarged detail view showing a modified form of the poppet valve, and Fig. 9 shows a pressure time card taken with the system of Fig. 1.

As illustrated herein and in accordance with my invention the system shown in Fig. 1 for obtaining a pressure time card comprises essentially a phase changing unit 10 that is driven by the engine crank-shaft 12 and operatively connected to the sampler valve unit 14 so that the sampler unit will admit gas therein under pressure during a brief interval once for each cycle of operation of the engine. This phase changing unit is also operatively connected to the recording drum 15 of the pressure recording unit 16 so that with every change of position of the period of admittance of the valve relative to the cycle of operation, the recording drum will be moved to a position corresponding to said period of admittance in said cycle.

The sampler unit 14, as best shown in Figs. 2 to 6, consists of a housing 112 that is provided with a cover plate 114 and with a threaded stem portion 116, which is adapted to be received within a suitable opening within the combustion chamber, as shown in Fig. 1. The cover plate is formed with an annular pilot 118, that is received within a complementary opening formed in the housing and is attached to the housing by means of bolts 120 and nipples 122 for a purpose hereinafter described.

The complementary opening in the housing is made sufficiently large to permit freedom of movement of the working parts disposed therein. A cam 124 is journaled within the housing by means of bearings 126 and 128, that are respectively seated within openings 130 and 132, formed within the housing and cover plate. The cam has concentric broached opening 134 to receive a driving shaft 136 that is universally connected with the phase gear through the universal connections 138 and 140 and the shaft 142, shown in Figs. 1 and 5. A rocker 144 is disposed within the opening of the housing and pivotally mounted on a rocker shaft 146 that is press-fitted into an opening 148 formed in the housing at one end and received in an opening formed in the cover plate at the other end. The rocker is disposed so that one arm 150 is adapted to cooperate with the cam 124, whereas the other arm 152 is seated on or cooperates with a poppet valve 154 of the sampler valve. The cam 124 is provided with a sharp lobe 156 so as to engage with the arm of the rocker to open the poppet valve for a brief interval. The poppet valve is slidably fitted within a bore 158, preferably formed concentric with the stem of the housing and within an opening 160 formed in the gland 162. The poppet valve is formed with a head 164 which is positioned approximately at the wall of the combustion chamber of the engine cylinder 20 and is seated against the valve seat 166 formed on the housing stem 116, as shown in Figs. 3 and 6, and is held in seated relation by means of a compression spring 168; that is disposed between a gland locking retainer 170 and a lock nut 172 that is threaded onto the valve stem. Interposed between the rocker arm 152 and the lock nut 172 is a tappet nut 174 that is threaded onto the poppet valve stem. The gland locking member 170 is formed with an opening at one end that slips over the gland and is attached to the housing by a screw 176 for fixing the gland in position.

As shown in Figure 7, the poppet valve at its lower end and adjacent the head 164 is formed with a reduced portion 178 to permit the gases to flow from the combustion chamber during the intervals when the valve is open through the outlet 179 and passageway 180 formed in the housing. The diameter of the valve stem and the inner diameter of the valve seat opening or inlet 181 are made equal so that the pressure within the space between the reduced portion and the wall of the bore 158 will hold the poppet valve when in the closed position substantially balanced with respect to the pressure on the outlet side thereof. Thus trapped recording pressures will not tend to open the valve when the pressure in the combustion chamber is less than the trapped recording pressures. The housing stem is formed with a counterbore 182 concentric with the bore 158 and is of a diameter equal to the diameter of the packing gland so as to provide a space between the poppet valve stem and the wall of the counterbore to receive packings 184 and 186, that are held in spaced relation by a packing spacer 188. The packing spacer is provided with an annular groove 190 for communicating with a passageway 192 formed in the housing and with perforations 194 for communicating oil to the poppet valve stem.

A liquid seal is maintained between the working surfaces of the poppet valve between the packings 184 and 186 at a pressure that is in excess of the pressure of the gases that are trapped in the sampler valve by a predetermined amount that is constant regardless of the change in pressure of the trapped gas. This is accomplished by providing a chamber 196 that is partially filled with sealing liquid 198, preferably oil, the chamber being so disposed with respect to the poppet valve that the sealing liquid within the chamber is above the passageway 192, to maintain at all times a pressure supply of sealing liquid to the packing spacer corresponding to the static head pressure of the liquid in the chamber and the pressure of the trapped gas. Communication between the bottom of the chamber and the passageway of the housing is established by means of pipe connections 200. The air space 202 above the sealing liquid in the chamber is in communication with the passageway 180 of the sampler valve by means of pipe connections 204. In this manner gases that are trapped within the sampler valve together with the static head pressure of the liquid in the chamber 196 will exert their pressure influence against the sealing liquid, which by reason of its communication with the packing spacer will maintain within the spacer a pressure of sealing liquid at all times greater than the pressure of the entrapped gases at the bottom of the packing on outlet side of the valve, thus preventing leakage of the gases.

Any suitable low speed pressure indicator may be employed as a recording means for obtaining pressure volume or pressure time card, and, as illustrated herein, the Maihak type of pressure recording indicator is employed for this purpose. The recording stylus 206, Fig. 1 of this recording pressure indicator is actuated by the pressure of the entrapped gases in the sampler valve and is preferably actuated through the liquid seal medium so that the escape of the gases through the working surfaces of the pressure recording device is prevented. This is accomplished by establishing communication between the bottom of the chamber 196 and the cylinder 208 of the pressure recording device through a pipe connection 210, the passageway in the pipe and the cylinder space 212 below the piston 214 being filled with the sealing liquid. This pressure recording device is provided with a conventional three-way cock 216, that is adapted to have communication with atmosphere through a passage 218 so that the atmospheric pressure may be recorded on the card. From the foregoing description it will be apparent that the intense pressures of the gaseous fluids in the internal combustion engine are not only transmitted to the recording device by means of a liquid medium, but that in addition thereto the said liquid medium serves to provide a liquid seal for the working surfaces of both the sampler valve and the pressure recording device.

In order to prevent air leakage within the liquid seal system, especially when the engine is running under pressure below atmosphere, a reservoir 220 of sealing liquid 222 may be connected to the atmospheric opening 218 of the indicator cock by means of a pipe connection 221. In this way should the pressure within the sampler valve be less than atmosphere the pressure differential between the atmosphere and that of the sampler valve will force some of the oil within the reservoir 220 into the system instead of allowing air to leak in.

The pressure recording device has the conventional recording drum 15, which is actuated by an indicator cord 224. one end of which is connected to the drum 15, the other end of which is connected to an extension 226, Fig. 1, formed on the member 102 that carries the scale 106 so that for any adjustment of the phase changing gear the recorder drum will assume a corresponding position. It will therefore be obvious that the recorded pressure is correlated to the time in the cycle of the period of opening the sampler valve, thus producing a pressure time record of the pressure cycle.

A suitable provision is made for dissipating the excess heat of the sampler valve. This is accomplished by circulating a cooling liquid through a suitable passageway 228 formed in the wall of the housing, the passageway 230 constituting an inlet and the passageway 232 constituting an outlet that are in communication with the passageway 228. The cooling liquid is supplied from a source of supply (not shown) and enters and leaves through the nipples 122, which nipples are preferably provided with threaded stems that pass through openings formed in the cover plate and serve to fasten the cover plate to the housing of the sampler valve.

The modification of sampler valve shown in Fig. 8 is similar in construction and design to the sampler valve shown in Fig. 7, except that the poppet valve is formed with a plurality of circumferential oil grooves disposed in spaced relation along the length of the poppet valve stem having a close fit with a valve guide. The valve guide has a pressed fit with the opening formed in the housing stem 116 and is provided with an annular recess 234 at the point which communicates with passageway 236 and is provided with a plurality of orifices for communication with an annulus 238. The sealing liquid is fed to the annulus in the same manner as it was before to the packing spacer in Fig. 7 to effect the liquid seal. By this arrangement the necessity for replacing the soft packing, as shown in Fig. 7, is eliminated.

In the operation the device is set at any identifying position in relation to the cycle of operations of the engine, as, for example, at top dead center of the engine piston. The phase gear is then adjusted by crank wheel 98 so that the sampler valve will open at that predetermined position of the engine piston. When obtaining a pressure time card, the adjustable scale carrying member 102 is moved so that the index 108 will indicate a corresponding position on the scale. A card is placed around the pressure recording drum and with the stylus pressed against the paper, the phase gear is slowly rotated by means of the crank wheel and handle 98 throughout one revolution of the phase gear. At the same time as the phase gear is being rotated the period of opening of the sampler valve is being moved through a corresponding engine crank angle.

Thus, as the sampler valve taps the cylinder pressure for a brief instant at gradually changing points in the cycle, the indicator stylus records automatically a series of pressure changes resulting in a distinct, continuous line of pressure-time relations on the card. The many small increments of pressure change in a given rotary movement of the recording drum makes possible an extremely accurate record, as no inertia effect in the recording mechanism is involved.

In the case of pressure-time diagrams, top center is determined by taking a compression card and noting where, on card and phase gear graduations, the peak of pressure occurs. On subsequent cards, a touch of the finger on the stylus, when this point is reached, establishes it as a reference point on the paper.

In making these cards the phase gear is rotated in the direction in which it was rotated in determining the top center and preferably so as to pass through the engine cycle in natural order of events.

During each period of opening of the sampler valve, a minute quantity of gas passes through the valve and equalizes the pressure within the sampler valve and recording cylinder 208 to that of the engine cylinder and the pressure of the gas within the sampler is trapped by the balanced poppet valve and remains constant until the next period of opening. The gas that is trapped within the sampler and its communication to the sealing liquid chamber exerts its pressure upon the liquid which transmits greater pressure to a point along the working surface of the poppet valve to provide a positive liquid seal against gas leakage and also transmits its pressure to the recording stylus piston 214 to actuate the stylus in accordance with the instant pressure of the gas. The liquid transmitting medium serves also to prevent the corrosive action of the gases upon the working surfaces which would otherwise take place if the sealing liquid were not employed.

What I claim is:

1. In a device for manifesting the pressure in an engine cylinder, pressure responsive indicating means, means defining a pressure passage between said cylinder and said pressure responsive means, valve means for admitting pressure from said cylinder to said passage, said last mentioned means comprising a valve body having a valve seat, a normally closed valve member slidably mounted in said body at one end and seating on said seat at the other end, means by which said valve may be momentarily opened to admit pressure, and a liquid in said passage in communication with the space between said valve member and said valve body and subject, at all times, to an initial substantial pressure head and responsive to said admitted pressure to prevent escape of said admitted pressure past said one end, said liquid being further communicatively connected with said pressure responsive indicating means for actuating the same.

2. In a device for indicating the pressure in an engine cylinder at a desired point in the engine cycle comprising, a valve body having a passage therein terminating in a port communicating with said cylinder, a poppet valve seated in said port for controlling communication between said cylinder and said passage, a valve stem for said valve reciprocable in a guide formed in said valve body, timed actuating means for momentarily lifting said valve off its seat, an annular channel in said valve guide, a lubricant supply source connected to said channel to lubricate said valve stem, a connection between said passage in said valve body and said lubricant supply source to transmit the pressure in said passage thereto to prevent leakage of the pressure medium along the valve stem, and pressure responsive measuring means connected to said lubricant supply source to indicate the pressure existing within said passage.

3. In a device for indicating the pressure in an engine cylinder, pressure responsive indicating means, a valve body having a normally closed chamber therein, a port for connecting said chamber to the engine cylinder, a reciprocable valve in said valve body for controlling fluid flow through said port, a guide in said valve body for guiding said valve and providing a small clearance space therebetween, a source of lubricant supply, a flow connection between said source and the clearance space between the valve and valve guide, a passage in said valve body for transmitting the gas pressure in said chamber to said lubricant supply source and a connection between said pressure responsive indicating means and said lubricant supply source, whereby the pressure of the lubricant from said supply source prevents pressure leakage from said chamber along said valve and also serves as a measure of the value of the existing pressure in said chamber.

4. The structure as claimed in claim 3, in which the level of the source of lubricant supply is arranged so that an initial static head is exerted at the point of communication of said supply with the clearance space between the valve and valve guide.

5. In a device for measuring the pressure at a desired point in the cycle in an engine cylinder, a valve body having a normally closed chamber therein, a passage connecting said chamber with the interior of the engine cylinder, a timed reciprocable valve for controlling flow between said cylinder and said chamber through said passage to trap gas samples in said chamber, a valve guide in said valve body for reciprocably guiding said valve and providing a small working clearance therebetween, a source of lubricant supply, a flow connection between said supply and the clearance space between said valve guide and said valve, and a pressure transmitting connection between said lubricant supply and said chamber, whereby said supply is subjected to the pressure existing within said chamber.

6. The structure as claimed in claim 5, in which the level of the source of lubricant supply is arranged so that an initial static head is exerted at the point of communication of said supply with the clearance space between the valve and valve guide.

FORD L. PRESCOTT.